Patented Sept. 13, 1932.

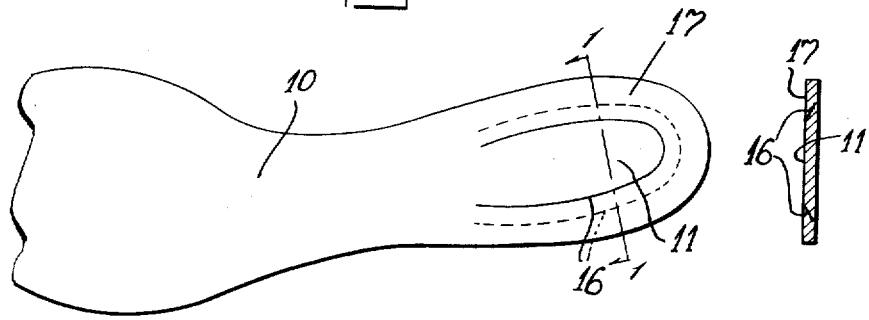
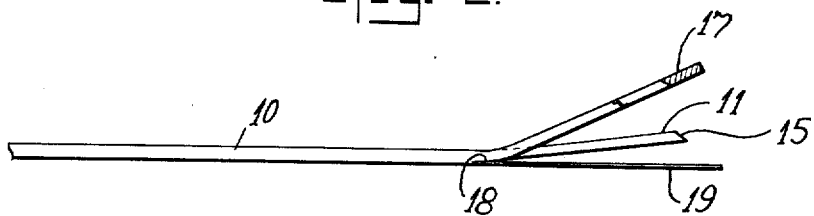
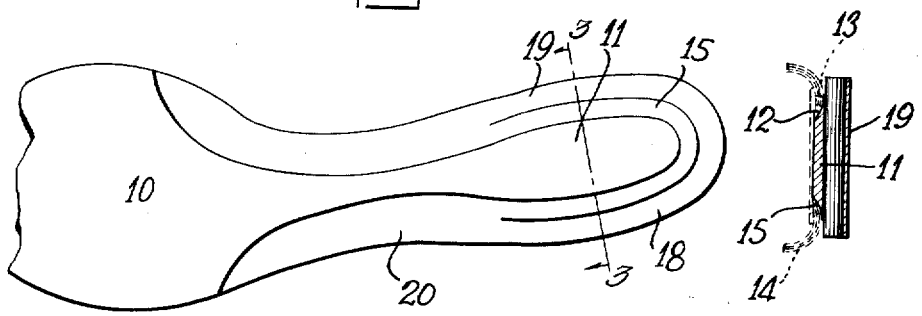

1,877,164

UNITED STATES PATENT OFFICE

NEWTON ELKIN, OF PHILADELPHIA, PENNSYLVANIA

OUTER SOLE AND METHOD OF PREPARING THE SAME

Application filed April 11, 1929. Serial No. 354,203.

This invention relates to outer soles for use in the manufacture of shoes and to methods of preparing the same.

A general object of the invention is to provide an outer sole which is formed or cut away at its heel-portion prior to sole-laying so that it will seat snugly within the cavity formed at the heel-seat by the overlapping layers of the lasting allowance of the lasted upper.

A more specific object of the invention is to provide an efficient and economical method of forming the heel-portion as aforesaid properly to accommodate the wood heel, thereby eliminating all of the costly hand work in current use, and producing a completely prepared heel seat for the wood heel, which is stronger and more uniform than that produced by any other known method.

Other objects of the invention will in part be obvious and will in part appear hereinafter.

The invention accordingly comprises the several steps and the relation and order of one or more of such steps with respect to each of the others, and the article possessing the features, properties, and the relation of elements which are exemplified in the following detailed disclosure, and the scope of the application of which will be indicated in the claims.

For a fuller understanding of the nature and objects of the invention reference should be had to the following detailed description taken in connection with the accompanying drawing, in which:

Figure 1 is a composite plan and sectional view along the line 1—1 illustrating one step in the preferred method of forming the heel-portion of an outer sole;

Fig. 2 is a side elevation partly broken away, illustrating a subsequent step of the said method; and Fig. 3 is a composite plan and sectional view along the line 3—3 showing the subsequent step of said method and typifying the finished product.

As indicated above, the invention in its broader aspects contemplates the provision of an outer sole having its heel-portion cut away in a manner such that the remaining portion seats snugly within the cavity formed at the heel-seat between the lasting allowance of the various layers of the lasted upper. For example, as is shown in Fig. 3, the outer sole 10 is formed with a tongue 11 on the upper side of its heel-portion, said tongue being shaped to seat within the cavity 12 formed by the various layers of the lasting allowance 13 of a shoe upper 14; said tongue 11 is of a thickness substantially equal to the combined thickness of the layers of the lasting allowance 13, and preferably is formed with beveled edges 15 which insure the proper seating thereof in the cavity 12.

Such a construction may be formed in any convenient manner without departing from the spirit of the present invention, but a preferred method of forming the same is that illustrated in the drawing.

After the sole 10 has been rounded out from a blank of leather, a transverse U-shaped cut 16 is made in the upper side of the heel-portion thereof, said cut conforming generally to the contour of the heel-portion of the sole and being preferably disposed inwardly from the edge thereof a distance 17 substantially equal to the lasting allowance of the shoe upper to which the sole is to be applied. This cut 16 preferably does not pass entirely through the sole, and is slanted outwardly in all directions from the middle of the heel when it is desired to produce the bevel 15 above referred to.

In the preferred method the next operation is the making of a horizontal split 18 at the heel-portion, which simultaneously forms a flap 19 for the use of the wood heeler, and by meeting the bottom of the U-shaped cut 16 releases the tongue 11 and the U-shaped marginal portion 17.

Finally, as is shown in Fig. 3, the sole is shanked out as at 20, during which operation the shanking-out cut meets the cuts 16 and 18, thereby severing the ends of the portion 17 and leaving the tongue 11 and the wood heel flap 19.

It will thus be seen that by means of the principles of the present invention there has been provided a new and useful outer sole construction which, by either using the wood heel flap 19 or cutting it off, lends itself readily to the manufacture of shoes of either the Louis or the Cuban wood heel type, respectively, and, in addition, there has been provided a novel and efficient method of forming such an outer sole prior to its application to a shoe and in a manner such that involved and delicate hand operations heretofore deemed necessary in the manufacture of shoes are eliminated.

Since certain changes in carrying out the above process, and certain modifications in the article which embody the invention may be made, without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention, what I claim as new and desire to secure by Letters Patent is:

1. A method of forming an outer sole prior to its application to a lasted upper, which includes, in combination, removing the margin of the heel-portion for a distance approximately equal to the width of the lasting allowance of the lasted upper to which the said sole is to be applied, thereby leaving a tongue-portion adapted substantially to fill the cavity formed at the heel-seat by said lasting allowance, said removal being effected by making a U-shaped cut freeing said margin and severing the ends of said margin by shanking-out the shank portion of said outer sole.

2. A method of forming the heel-portion of an outer sole prior to its application to a lasted upper, which includes, in combination, making a U-shaped cut partly therethrough downwardly from the upper side and at a distance from the edge of the heel-portion approximating the width of the lasting allowance of the lasted upper to which said outer sole is to be applied, splitting said heel-portion horizontally near the bottom thereof to meet said U-shaped cut, and thereafter removing the marginal portion bounded by said cut and said split; said U-shaped cut being inclined outwardly from the top on the flesh side of the sole whereby the portion remaining after removal of said U-shaped portion is formed with a downwardly- and outwardly-beveled edge.

3. A method of forming the heel-portion of an outer sole prior to its application to a lasted upper, which comprises making a U-shaped cut partly therethrough downwardly from the upper side and at a distance from the edge of the heel-portion approximating the width of the lasting allowance of the lasted upper to which said outer sole is to be applied, splitting said heel-portion horizontally near the bottom thereof to meet said U-shaped cut, and thereafter removing the marginal portion bounded by said cut and said split; said removal being accomplished by shanking-out the shank-portion of the outer sole in a manner such that the shanking-out cuts meet said cut and said split at their rear ends.

4. A method of forming the heel-portion of an outer sole prior to its application to a lasted upper, which comprises, in combination, making a downwardly- and outwardly-inclined U-shaped cut from the top of said heel-portion to near the bottom thereof, splitting said heel-portion near the bottom thereof in a manner such as to meet said cut, and shanking-out the shank-portion of said outer sole in a manner such that the shanking-out cuts meet the first-mentioned cut and the split.

5. As a new article of manufacture, a shanked-out outer sole adapted to be applied to a lasted upper to form a shoe, said outer sole having the margin of its heel-portion cut away for a distance approximately equal to the width of the lasting allowance of the lasted upper at the heel-seat, and having a tongue adapted to lie within the cavity in the heel-seat formed by said lasting allowance; said tongue having its edges beveled downwardly and outwardly from the top of the outer sole, the end portions of said beveled edges having slopes which merge with the slopes of the shanked-out surfaces of said sole.

6. As a new article of manufacture, an outer sole adapted to be applied to a lasted upper to form a shoe, said heel-portion being provided with a Louis wood heel flap and having a marginal portion of the remainder thereof cut away for a distance approximately equal to the width of the lasting allowance of the lasted upper at the heel-seat, and having a tongue adapted to lie within the cavity in the heel-seat formed by said lasting allowance; said tongue having its edges beveled downwardly and outwardly from the top of the sole.

7. As a new article of manufacture, an outer sole adapted to be applied to a lasted upper to form a shoe, said heel-portion being provided with a Louis wood heel flap and having a marginal portion of the remainder thereof cut away for a distance approximately equal to the width of the lasting allowance of the lasted upper at the heel-seat, and having a tongue adapted to lie within the cavity in the heel-seat formed by said lasting allowance; said tongue having its edges beveled downwardly and outwardly from the top of the sole; said outer sole having its shank shanked-out in a manner to meet the bevel of the tongue.

In testimony whereof I affix my signature.

NEWTON ELKIN.

CERTIFICATE OF CORRECTION.

Patent No. 1,877,164.      September 13, 1932.

NEWTON ELKIN.

It is hereby certified that error appears in the printed specification of the above numbered patent requiring correction as follows: Page 2, line 75, claim 3, after "comprises" insert the commas and words , in combination,; and that the said Letters Patent should be read with this correction therein that the same may conform to the record of the case in the Patent Office.

Signed and sealed this 29th day of November, A. D. 1932.

M. J. Moore,
Acting Commissioner of Patents.

(Seal)

outer sole adapted to be applied to a lasted upper to form a shoe, said heel-portion being provided with a Louis wood heel flap and having a marginal portion of the remainder thereof cut away for a distance approximately equal to the width of the lasting allowance of the lasted upper at the heel-seat, and having a tongue adapted to lie within the cavity in the heel-seat formed by said lasting allowance; said tongue having its edges beveled downwardly and outwardly from the top of the sole; said outer sole having its shank shanked-out in a manner to meet the bevel of the tongue.

In testimony whereof I affix my signature.

NEWTON ELKIN.

CERTIFICATE OF CORRECTION.

Patent No. 1,877,164.      September 13, 1932.

NEWTON ELKIN.

It is hereby certified that error appears in the printed specification of the above numbered patent requiring correction as follows: Page 2, line 75, claim 3, after "comprises" insert the commas and words , in combination,; and that the said Letters Patent should be read with this correction therein that the same may conform to the record of the case in the Patent Office.

Signed and sealed this 29th day of November, A. D. 1932.

M. J. Moore,
Acting Commissioner of Patents.

(Seal)

CERTIFICATE OF CORRECTION.

Patent No. 1,877,164.  September 13, 1932.

NEWTON ELKIN.

It is hereby certified that error appears in the printed specification of the above numbered patent requiring correction as follows: Page 2, line 75, claim 3, after "comprises" insert the commas and words , in combination,; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.